Sept. 18, 1923.                J. GEDEON ET AL                1,468,346
                                 CHILD'S VEHICLE
                        Filed Jan. 16, 1922        2 Sheets-Sheet 2
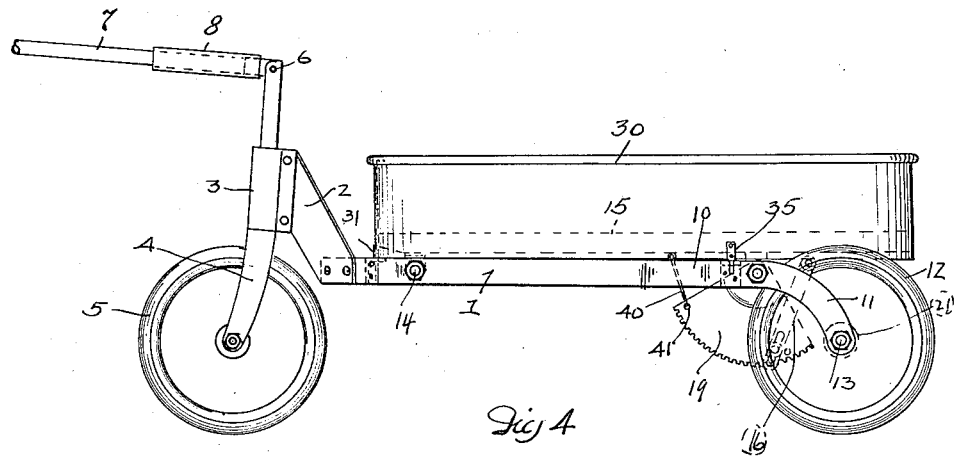
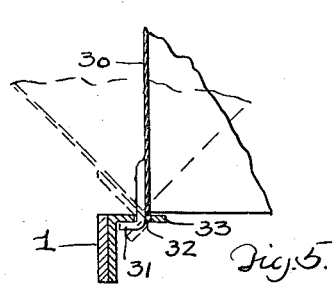
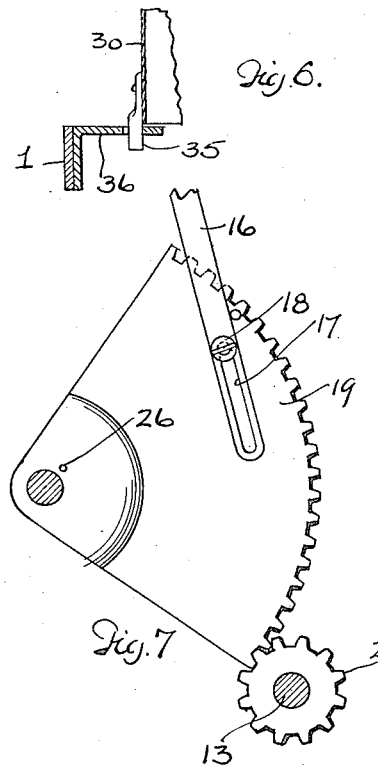
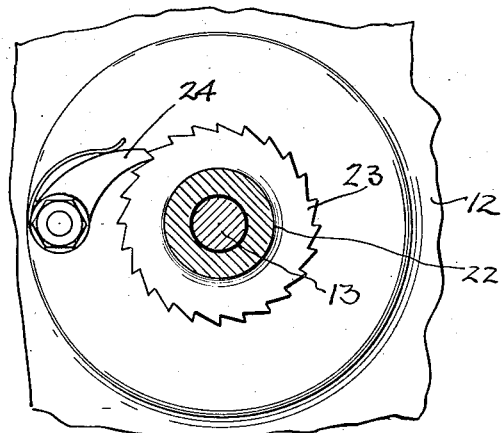
INVENTOR.
James Gedeon and
BY William Miller
Fay. Oberlin & Fay
ATTORNEYS Patented Sept. 18, 1923.

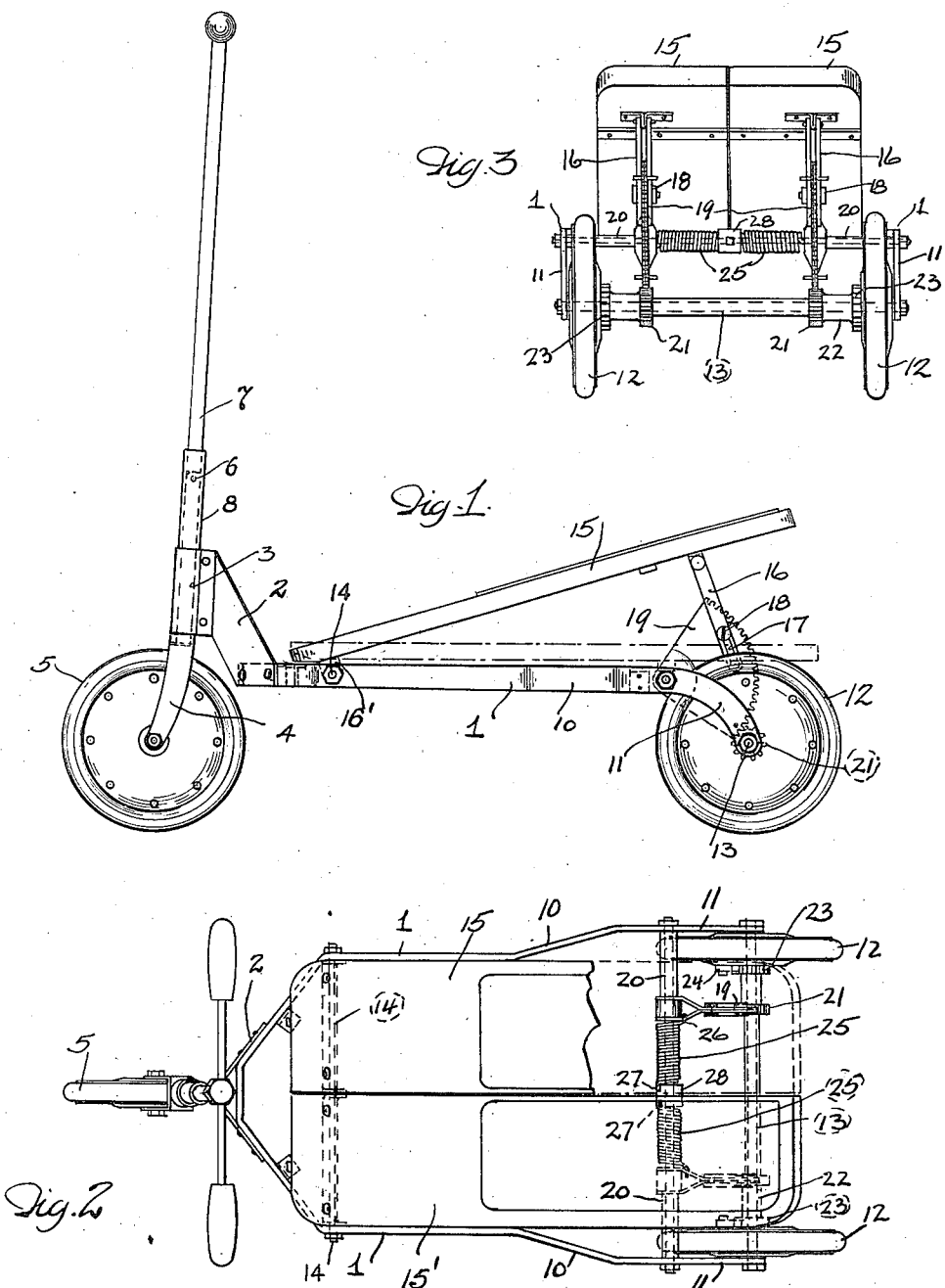

1,468,346

UNITED STATES PATENT OFFICE.

JAMES GEDEON AND WILLIAM MILLER, OF CLEVELAND, OHIO.

CHILD'S VEHICLE.

Application filed January 16, 1922. Serial No. 529,552.

*To all whom it may concern:*

Be it known that we, JAMES GEDEON and WILLIAM MILLER, citizens of the United States, and residents of Cleveland, county of Cuyahoga, State of Ohio, have jointly invented a new and useful Improvement in a Child's Vehicle, of which the following is a specification, the principle of the invention being herein explained and the best mode in which we have contemplated applying that principle, so as to distinguish it from other inventions.

The present invention relating as indicated to children's vehicles, is directed more particularly, to such a vehicle which may be operated either by the child by pedaling, or may be pulled and used as a cart. A further object of the invention is the provision of a vehicle of the type above described, which may be conveniently and speedily operated by children of various sizes and which may be conveniently converted into a cart or wagon when desired. To the accomplishment of the foregoing and related ends, said invention, then, consists of the means hereinafter fully described and particularly pointed out in the claims.

The annexed drawing and the following description set forth in detail certain mechanism embodying the invention, such disclosed means constituting, however, but one of various mechanical forms in which the principle of the invention may be used.

In said annexed drawings:—

Fig. 1 is a side elevation of our improved invention; Fig. 2 is a plan view of the same; Fig. 3 is a rear view; Fig. 4 is a side elevation showing the vehicle provided with a cart or wagon body; Fig. 5 is a sectional view on an enlarged scale showing the means securing the front end of the cart body to the vehicle frame; Fig. 6 is a similar view showing the means of securing the rear end of the cart body to the frame; Fig. 7 is a side elevation on an enlarged scale of the driving means for the rear wheels of the vehicle; and Fig. 8 is an enlarged side elevation showing the driving connection between the driving means and the wheels.

Our device consists of a frame work made up of two substantially parallel side frame members 1 which, at their forward ends, converge and are secured to a plate 2 in which is pivotally mounted a steering shaft 3 attached to a wheel fork 4 in which the front or steering wheel 5 of the vehicle is supported. This shaft 3 extends upwardly through the supporting plate 2 and is hinged about a pin 6 to a steering handle 7. The handle 7 and shaft 6 are normally maintained in alignment in the position shown in Fig. 1 by means of a tubular sleeve 8 which rests upon the top of the supporting plate 2, but which may be slipped upwardly into the position shown in Fig. 4, when it allows the handle 7 to be swung forwardly to serve as a handle for pulling the vehicle when in use as a cart.

The frame members 1 diverge for a short distance at the point 10 and then again have parallel portions 11 in which the rear wheels 12 of the vehicle are mounted, these wheels being mounted upon a stationary shaft or spindle 13 which extends through the rear end of the vehicle, this shaft being journalled at either end in the frame members 11. A second transverse shaft or spindle 14 extends across the forward part of the frame, being journalled in the frame members 1, this shaft pivotally supporting two pedal boards 15 and 15', each of which is provided with a bracket 16' extending downward and engaging about the shaft 14. These two strips 15 and 15' are the pedal members through the operation of which the vehicle is moved, and they also serve as a floor of the vehicle when the latter is used as a cart, as is shown in Fig. 4.

Each of the pedals 15 and 15' is provided at its rear end with a link 16 which has an elongated slot 17 therein, in which is engaged a pin 18 carried on a toothed quadrant, 19, this quadrant being pivotally mounted on the shaft 20 which extends transversely between the frame members 11 a slight distance ahead of the shaft or rear axle 13. This toothed quadrant 19 engages with a small pinion 21 which is formed on one end with a sleeve 22 rotatably carried upon the rear axle 13. The lost motion, resulting from the slot 17, between the link 16 and quadrant 19 is provided to allow said quadrant to be swung down out of engagement with pinion 21, for a purpose to be hereinafter more fully set forth. Upon the other end of this sleeve 22 is a ratchet 23 which is engaged by a spring pressed pawl 24, mounted on the inner side of the wheel 12. Downward movement of the pedal 15 swings the quadrant 19 about its center in a clockwise direction turning the gear 21 in a counter-clockwise direction, and in this way, operating the ratchet 23 and the pawl 24. This operation of these driving parts turn the wheels 12 in a forward direction and propels the vehicle over the ground or floor. The quadrants and pedals are returned to their normal or upper position (shown in Fig. 1), by means of two coiled springs 25, each of which has one end 26 attached to the quadrant 19, while the two other ends 27 of the springs are attached to a sleeve 28, secured on the shaft 20. Each of the springs is tensioned by the downward movement of the quadrant and the resiliency of the spring serves to return the quadrant and pedal to the original or upper position.

The operation of the device through the means just described, is quite simple, the operator standing on the device with one foot on each of the pedals 15 and 15'. He then alternately lifts first one foot and then the other, in this way allowing first one pedal 15 and then the other pedal 15' to rise to their upper position. As soon as one of the pedals has risen to its upper position the operator presses down with his foot on the pedal as far as it will go, and by rapidly alternating this movement of his feet a practically continuous drive can be given to the rear wheels of the vehicle.

In Fig. 4 we have shown the vehicle converted into a cart or wagon and this may readily be done by securing the two pedals in their lowermost or horizontal position and then mounting a box 30 on the frame and pedals. This box 30 is provided with right angled lugs 31 at its forward end which engage in openings 32 in lugs 33, which are attached to the inside of the frame members 1 at the point where they converge toward each other. In order to mount the box it is necessary to insert the lug 31 when the box is in the tilted position shown in dotted lines in Fig. 5. As soon as the lug 31 is engaged in the lug 33, the box is swung downwardly onto the frame members and the pedals 15 and 15' when other lugs 35 are engaged in openings in lugs 36 which are secured to the frame members 1. If desired, locking means can be used for more securely fastening the box to the frame but the means described prevent any accidental disengagement of the box as it can only be removed by tilting it about the forward end and then pulling it upwardly the disengage the lug 31.

The pedals when brought to the horizontal position are held there by means of hooks 40 which engage in holes 41 in the lower edge of the quadrant. The quadrant first is brought into the position shown in Fig. 4, that is, out of engagement with the pinion 21 which is made possible by the lost motion connection between quadrant and link through the slot 17 and pin 18. The hook 40 not only holds the pedal boards down in their horizontal position, but also holds the quadrants in inoperative relation with respect to the gears 21, and the rear wheels are free to turn irrespective of the pedal boards and quadrants.

When the device is to be used as a cart or wagon, the handle 7 is swung forwardly into the position shown in Fig. 4 as has been previously described, and the handle may be used either to pull the vehicle or may be swung over the box if the child desires to sit in the cart and steer it from that position, while propelling it by pushing against the ground.

The present vehicle is one that has been found attractive to children of various ages, and is also a vehicle which may be readily converted to serve the double purpose indicated. The device is simple and inexpensive in its construction and the fast movement necessary to propel it is a natural one that is easily acquired by children and one that is not tiring or injurious.

Other modes of applying the principle of our invention may be employed instead of the one explained, change being made as regards the mechanism herein disclosed, provided the means stated by any of the following claims or the equivalent of such stated means be employed.

We therefore particularly point out and distinctly claim as our invention:—

1. In a child's vehicle of the character described, the combination of a frame, a rear wheel secured thereto, a pedal member pivotally attached to said frame, a quadrant gear pivotally mounted on said frame and connected to operate said rear wheel in one direction only, and a link attached to said pedal and said quadrant and having a lost motion connection to said quadrant.

2. In a child's vehicle of the character described, the combination of a frame, front and rear wheels supporting the same, a sleeve coaxially mounted with respect to one of said wheels, a ratchet on said sleeve, a pawl on said wheel engaging said ratchet whereby said wheel is operated by rotation of said sleeve, means adapted to effect the rotation of said sleeve, said means including a pinion on said sleeve, a pivoted quadrant gear engaging therewith, pedal means for operating said gear, means normally maintaining the operation of said quadrant gear within limits permitting continued engagement with said pinion, and lost motion connections between said pedal means and said gear, whereby said quadrant may be moved out of mesh with said pinion.

3. In a child's vehicle of the character described, the combination of a frame, front and rear wheels supporting the same, a sleeve coaxially mounted with respect to one of said wheels, a ratchet on said sleeve, a pawl on said wheel engaging said ratchet whereby said wheel is operated by rotation of said sleeve, means adapted to effect the rotation of said sleeve, said means including a pinion on said sleeve, a pivoted quadrant gear engaging therewith, pedal means for operating said gear, means normally maintaining the operation of said quadrant gear within limits permitting continued engagement with said pinion, lost motion connections between said pedal means and said gear, whereby said quadrant gear may be moved out of mesh with said pinion, and means adapted to thereupon lock said quadrant in such inoperative position.

4. In a vehicle of the character described, the combination of a frame having a front steering wheel and two rear wheels, pedal boards pivotally attached to said frame, driving connections between said pedal boards and said rear wheels, and means for locking said boards against the frame and for rendering said driving connections inoperative, the pedal boards forming a seat when locked against the frame.

5. In a vehicle of the character described, the conbination of a frame, pedal boards pivotally mounted thereon, and means for locking said pedal boards onto said frame to form a seat thereon.

6. In a vehicle of the character described, the combination of a frame, a pair of pedal boards coaxially pivoted on said frame, the width of said pedal boards being substantially equal to that of the frame, and means for securing said boards against the frame to form a seat thereon.

Signed by us, this 12th day of January, 1922.

JAMES GEDEON.
WILLIAM MILLER.